United States Patent Office 3,035,320
Patented May 22, 1962

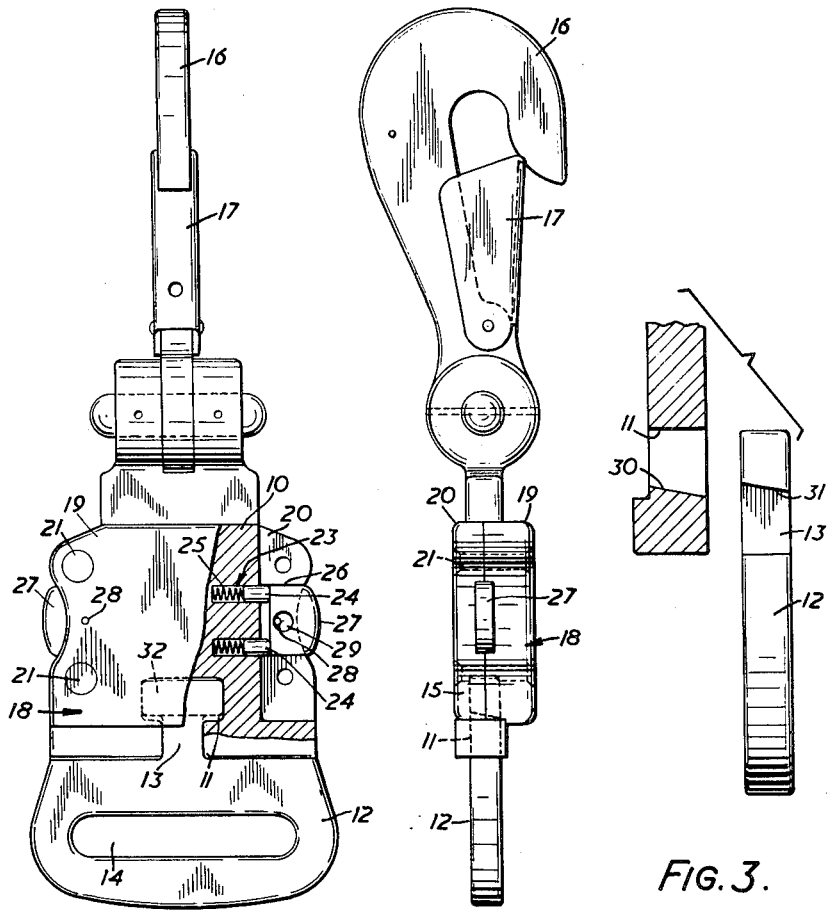

3,035,320
RELEASABLE CONNECTORS
Frank Bernard Harley, Egham, England, assignor to Harley Patents (International) Limited, London, England, a British company
Filed Apr. 22, 1958, Ser. No. 730,158
Claims priority, application Great Britain Apr. 24, 1957
9 Claims. (Cl. 24—230)

This invention relates to releasable connectors.

According to the present invention a releasable connector comprises two separable members having load-bearing parts which can be interengaged to transmit a tensile load from one member to the other but can be separated by relative movement in a direction substantially at right angles to the line of such tension, an abutment carried by one member and movable between a locking position in which it prevents such separation of the load-bearing parts, and a release position in which it permits it, and locking means to retain the abutment in its locking position.

Preferably the abutment is afforded by a sleeve surrounding one of the members and mounted to slide on it parallel to the line of the load. The load bearing parts conveniently comprise a T-shaped recess on one member co-operating with a corresponding T-shaped tang on the other member.

In one arrangement the locking means comprise at least one spring biassed pin mounted on either one member or the abutment, and a shoulder on the other member against which a part of the pin can engage to retain the abutment.

Preferably the reaction surfaces of the load bearing parts are inclined to the direction of the tensile load so that the parts tend to separate when the load is applied.

The invention may be carried into practice in a number of ways but several specific embodiments will now be described by way of example with reference to the accompanying drawings, in which:

FIGURE 1 is a plan view partly in section of a releasable connector for parachute harness;

FIGURE 2 is a side elevation of the connector of FIGURE 1; and

FIGURE 3 is an exploded view, partly in section of the interengaging parts of the plate and block of the embodiment of FIGURES 1 and 2.

The embodiment shown in FIGURES 1 to 3 is concerned with a releasable connector for parachute harness, comprising two separable members one of which will be connected to the parachute whilst the other is connected to the user's clothing. The latter comprises a generally rectangular block 10 having in one face, referred to herein as the upper face, a T-shaped recess 11 whilst the other member comprises a plate 12 affording a T-shaped tang 13 correspondingly shaped to fit into the T-shaped recess 11, and an elongated slot 14 for receiving a strap to secure the plate to secure the plate to the user's clothing. The block 10 and flat plate 12 can be engaged by dropping the T-shaped tang 13 into the corresponding recess 11 in the block.

The block 10 has a hook 16 secured to it which has a pivoted U-shaped spring loaded catch member 17 for easy and secure connection to a parachute. In this particular embodiment the stem of the T of the recess in the block does not extend completely through the block but is blocked off by an integral part 15 of the block. In this way the tang 13 of the plate is merely dropped into the recess from one side and is prevented from passing directly through it.

In accordance with the present invention an abutment is provided to retain the tang 13 in the recess 11. This takes the form of a sleeve or slide 18 surrounding the block 10 and slidable thereon between a position (shown in FIGURE 1) in which it covers the head of the tang 13 and the recess 11 to prevent relative movement between them and a position in which it is clear of the recess and in which the tang 13 can be easily removed therefrom.

The slide 18 is formed in two opposed halves 19 and 20 each of generally flattened U section the ends of the arms of which abut one another and are riveted together at 21. The slide 18 is provided with means for locking it in the position in FIGURE 1 in which it covers the T-shaped tang and slot. Thus, received in transverse holes 23 in each side of the block, are pairs of pins 24 which are outwardly biassed by coil springs 25 to engage the ends of a slot 26 formed in the side of the slide and so prevent movement of it relative to the block. The slot 26 in each side of the slide extends through to the outer wall and receives release plates 27 the inner ends of which engage the outer ends of the pins 24. The outer ends of the release plates 27 extend beyond the slide which, as shown on the left of FIGURE 1, is appropriately hollowed out at these points to enable the two plates 27 to be forced inwards by finger and thumb against the action of the spring biassed pins 24. The two release plates 27 are each retained in the slots 26 by pins 28 passing downwards through the slide and holes 29 in the plates, thus permitting limited movement of the plates.

To release the slide 18 and permit its movement along the block 10 the two plates 27 are pressed inwards to retract the pins into the holes 23 in the block whereupon the slide 18 is free to move back away from the T-shaped slot 11 in the block 10. During this movement the pins nearest the T-shaped slot will remain retracted and will bear on the inside of the slide. It will be noticed from FIGURE 3 that the interengaging faces 30 of the recess 11 and 31 of the head 32 of the plate 12 are inclined to the general axis of the connector so that the two parts tend to slide apart when a load is applied and thus when the slide is moved clear of the recess 11 only a very slight pull is required to draw the tang 13 from the recess. In practice the weight of a parachute attached to the connector is quite sufficient to draw the tang out of the recess immediately the slide is moved clear.

As soon as the slide 18 is returned to a position covering the T-shaped slot in the block the pins 24 will be forced outwards by their springs into the slot 26 in the slide and so retain it in that position.

What I claim as my invention and desire to secure by Letters Patent is:

1. A releasable connector comprising first and second separable members having load-bearing parts which can be interengaged to transmit a tensile load from one member to the other but can be separated at right angles to the line of such tension, a sleeve surrounding the first separable member and mounted to slide on it parallel to the direction of the load between a locking position in which it prevents such separation of the load-bearing parts, and a release position in which it permits such separation, locking means to retain the sleeve in the locking position, the locking means comprising as least one pin mounted to slide in a bore in the first separable member, the bore extending transverse to the line of tension, means biassing the pin to an extended position in which it protrudes from the first separable member and engages a shoulder afforded by the sleeve to retain the sleeve in the locking position, and a press member transversely movable within a slot in said sleeve and provided with a thrust surface which abuts the outer end of said pin and is larger in area than the cross-section of said bore, said press member being movable into a position in which said thrust surface is flush with the end of said bore, and holds said pin inward of said shoulder, thereby permitting movement of said sleeve to said release position.

2. A releasable connector as claimed in claim 1 in which the first separable member comprises a block having a pair of transverse holes in each side, and a spring biased pin is seated in each hole, said sleeve being provided with a slot opposite each pair of holes and into which said pins project when said sleeve is in locking position, each of said slots receiving a press member.

3. A releasable connector as claimed in claim 1 in which the load bearing parts are provided with flat opposed reaction surfaces which are inclined to the direction of the tensile load so that the parts tend to separate when the load is applied.

4. A releasable connector as claimed in claim 3 in which the load-bearing parts comprise a T-shaped recess on one member cooperating with a corresponding T-shaped tang on the other member.

5. A releasable connector as claimed in claim 4 in which the inclined reaction surfaces are afforded by the undersides of the heads of the T-shaped recess and tang.

6. A releasable connector as claimed in claim 2 in which the press members protrude from the said slots and can be engaged by finger and thumb to be pressed towards one another.

7. A releasable connector as claimed in claim 6 in which the press members are each retained in their respective slots by a pin passing through a hole in the press member considerably larger than the pin, the ends of the pin being secured to the sleeve.

8. A releasable connector as claimed in claim 2 in which one spring biassed pin on each side remains retracted into its hole in the first separable member in the release position while the other spring biassed pin on each side remains protruding into the slot in the sleeve.

9. A releasable connector as claimed in claim 8 in which each of the said other spring biassed pins in the release position engages the end of its respective slot in the sleeve which is engaged by the first pin on that side when in the locking position.

References Cited in the file of this patent

UNITED STATES PATENTS

| | | |
|---|---|---|
| 859,634 | Vizents et al. | July 9, 1907 |
| 949,014 | Aikins | Feb. 15, 1910 |
| 2,393,072 | Skinner | Jan. 15, 1946 |
| 2,740,656 | Gaylord | Apr. 3, 1956 |
| 2,870,509 | Gaylord | Jan. 27, 1959 |
| 2,902,737 | Moran | Sept. 8, 1959 |